(12) United States Patent
Secrest et al.

(10) Patent No.: US 10,668,822 B2
(45) Date of Patent: Jun. 2, 2020

(54) ELIMINATION OF FUNDAMENTAL HARMONIC POSITION MEASUREMENT ERRORS IN A VECTOR-BASED POSITION SENSING SYSTEM

(71) Applicant: GM GLOBAL TECHNOLOGY OPERATIONS LLC, Detroit, MI (US)

(72) Inventors: Caleb W. Secrest, Shelby Township, MI (US); David S. Ochs, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 166 days.

(21) Appl. No.: 15/659,209

(22) Filed: Jul. 25, 2017

(65) Prior Publication Data
US 2019/0031046 A1  Jan. 31, 2019

(51) Int. Cl.
| | |
|---|---|
| B60L 15/02 | (2006.01) |
| B60L 50/51 | (2019.01) |
| B60L 50/50 | (2019.01) |
| H02P 6/16 | (2016.01) |
| B60L 15/20 | (2006.01) |

(52) U.S. Cl.
CPC ......... *B60L 15/025* (2013.01); *B60L 15/2045* (2013.01); *B60L 50/50* (2019.02); *B60L 50/51* (2019.02); *H02P 6/16* (2013.01); *B60L 2240/421* (2013.01); *B60L 2240/423* (2013.01); *B60L 2240/427* (2013.01); *B60L 2240/429* (2013.01)

(58) Field of Classification Search
CPC ....................................................... B60L 15/025
See application file for complete search history.

(56) References Cited

U.S. PATENT DOCUMENTS

| | | | | |
|---|---|---|---|---|
| 2005/0031322 | A1* | 2/2005 | Boyle ............... | A61M 16/0057 388/800 |
| 2015/0158396 | A1* | 6/2015 | Walters ..................... | H02P 6/16 701/22 |
| 2017/0373617 | A1* | 12/2017 | Shimizu ................. | G03G 15/50 |

* cited by examiner

*Primary Examiner* — Imran K Mustafa
(74) *Attorney, Agent, or Firm* — Quinn IP Law

(57) ABSTRACT

A rotary system includes a rotor, a vector-based position sensor, and a controller executing a method to eliminate fundamental harmonic position measurement error. The sensor measures angular position of the rotor and outputs raw sine and cosine signals representative of the angular position. The raw signals have a fundamental harmonic position measurement error at the frequency of the sensor signals. The controller receives the raw signals, adaptively adds or subtracts sensor signal offsets to or from the raw signals to generate offset sine and cosine signals, calculates a corrected position of the rotor using the offset sine and cosine signals eliminating the fundamental error, and controls an action or state of the rotary system using the corrected position. The rotor may be part of an electric machine, such as in a vehicle.

15 Claims, 5 Drawing Sheets

| Z | $\angle \dfrac{\hat{\theta}_{err}}{\theta}$ [deg] | S COR | C COR |
|---|---|---|---|
| I | 225 - 270 | - S_SIG*sign($\omega$) | - C_SIG*sign($\omega$) |
| II | 135 - 225 | C_SIG | - S_SIG |
| III | 45 - 135 | S_SIG*sign($\omega$) | C_SIG*sign($\omega$) |
| IV | 0 - 45 | - C_SIG | S_SIG |

ELIMINATION OF FUNDAMENTAL HARMONIC POSITION MEASUREMENT ERRORS IN A VECTOR-BASED POSITION SENSING SYSTEM

INTRODUCTION

Rotary devices in the form of wheels, hubs, gear elements, and engine or motor shafts are used to perform work in a variety of systems. Precise knowledge of the angular position of such rotary devices is useful in the overall control and monitoring of the system. A resolver is a common "vector-based" position sensor that is specially configured to measure angular position using a rotary transformer pair. A voltage output from a primary winding of the transformer pair is coupled into secondary windings, also referred to as the sine and cosine windings, which in turn are offset from each other by 90 degrees. Amplitude of the output voltage of the transformer pair varies with the changing angular position, and is captured as raw sine and cosine signals, respectively. Other types of vector-based position sensors include magneto-resistive sensors, certain encoders, and various "sensorless" technologies.

Ideally, the raw sine and cosine signals from the vector-based position sensor are orthogonal with respect to each other and have the same amplitude. However, imperfections in sensing and signal transmission hardware may produce signal delay, noise, and other anomalies. Additionally, mechanical misalignment of the sensor often produces periodic position measurement errors, particularly at the sensor's fundamental frequency. Such errors affect overall system control accuracy, potentially manifesting as undesirable current ripple and torque ripple when the rotary device is embodied as a rotor of an electric machine.

SUMMARY

Vector-based position sensing systems and related position error correction methods are disclosed herein. The systems and methods used in the control of a rotary device/rotor are intended to help eliminate the types of fundamental harmonic position measurement errors noted above. Such error elimination is achieved by a controller through the deliberate introduction of equal and opposite position measurement error within an integral control loop having a motion state filter. The introduced error signals ultimately drive the fundamental harmonic position measurement error to zero, thereby allowing the controller to derive a corrected position signal for use in the control system.

As part of the present approach, raw position signals from a vector-based position sensor such as a rotary encoder or a resolver are used as correlation inputs into the control loop, i.e., the sensor signals are correlated to an angle error as determined via the motion state filter. The controller may use speed/phase-dependent selection of the correlation inputs to improve convergence dynamics, or in other words, to enable the controller to drive the error to zero at a rapid rate, or the controller may use speed-dependent gain scheduling of the motion state filter to maintain a single phase zone and thus eliminate the need for such selection.

In an example embodiment, the rotary system includes a rotor having an axis of rotation, a vector-based position sensor, and a controller. The sensor measures an angular position of the rotor with respect to the axis of rotation and outputs the measured angular position as raw sine and cosine signals. The signals have a fundamental harmonic position measurement error. The controller receives outputs from the vector-based position sensor which, depending on the sensor type, may or may not require additional signal processing to extract the raw sine and cosine signals corresponding to the sine and cosine of the rotor's angular position, respectively.

The controller then introduces a set of sensor signal offsets. The offsets are added or subtracted from the raw sine and cosine signals to generate offset sine and cosine signals. The offset signals may be output by an integral control loop of the controller and the motion-state filter noted above. The controller thereafter calculates a corrected position signal using the offset sine and cosine signals that eliminates the fundamental harmonic position measurement error, and controls an action or state of the rotary system using the corrected position signal, such as by regulating a motion state of an output shaft, regulating an output speed or output torque from the rotor, or otherwise changing or maintaining an external or internal state of the rotary system.

The controller may be programmed to determine a corresponding phase zone of an estimated position error of the rotor, and to select correlation signals based on the corresponding phase zone to thereby generate the offset sine and cosine signals.

In some embodiments, the controller may manipulate the correlation signals or tune the motion-state filter as a function of a rotational speed of the rotor.

The system may include an electric machine having a motor output shaft, with the rotor noted above being the motor output shaft. The electric machine may be included as part of a powertrain of a motor vehicle having drive wheels, with the motor output shaft configured to deliver output torque to the drive wheels.

A method is also disclosed for eliminating a fundamental harmonic position measurement error in a rotary system having a rotor with an axis of rotation. According to an example embodiment, the method includes measuring an angular position of the rotor with respect to the axis of rotation using a vector-based position sensor, and then outputting raw sine and cosine signals representative of the measured angular position, with the raw sine and cosine signals including the fundamental harmonic position measurement error. The method further includes receiving the raw sine and cosine signals from the position sensor via a controller, and then adaptively adding or subtracting sensor signal offsets to or from the raw sine and cosine signals, respectively, to thereby generate offset sine and cosine signals. Additionally, the method in this embodiment includes calculating a corrected position of the rotor using the generated offset sine and cosine signals and controlling an action or state of the rotary system via the controller using the corrected position.

Generating the offset sine and cosine signals may include using an integral control loop and a motion-state filter of the controller. Measuring the angular position includes using a rotary encoder in some embodiments.

The controller may be programmed to determine a corresponding phase zone of an estimated position error of the rotor. In such an embodiment, the method may include selecting correlation signals based on the corresponding phase zone, and then generating the offset sine and cosine signals using the correlation signals.

The rotary system may include a motor output shaft of an electric machine. The controller, as part of the method, may regulate a motion state of the electric machine, e.g., maintain or change an output speed or an output torque of the motor output shaft by regulating a d-axis or q-axis current of the electric machine.

The above-noted and other features and advantages of the present disclosure are readily apparent from the following detailed description of the best modes for carrying out the disclosure when taken in connection with the accompanying drawings.

Figure 1:
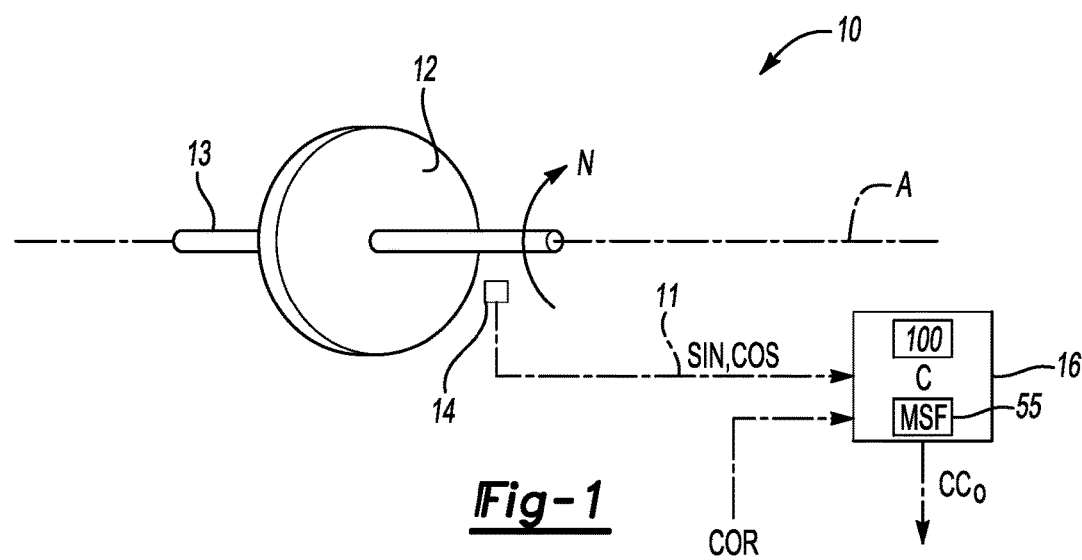
FIG. 1 is a schematic illustration of an example rotary system having a rotor, a vector-based position sensor, and a controller configured to eliminate fundamental harmonic position error in raw position signals from such a sensor.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to the same or similar components throughout the several views, and beginning with FIG. 1, an example system 10 is shown that includes a rotary device or rotor 12, a vector-based position sensor 14, and a controller (C) 16. The controller 16 is in communication with the vector-based position sensor 14, such as via a controller area network or low-voltage transfer conductors, and is configured to receive raw sine and cosine signals (arrow 11) from the sensor 14, with the signals (arrow 11) also labeled SIN and COS in FIG. 1 for clarity.

The controller 16 is further configured to eliminate fundamental harmonic position measurement errors in the raw sine and cosine signals (arrow 11), which may be otherwise perfect or errorless. The controller 16 proceeds with error elimination according to a method embodied by a set of control logic 100, variations of which are described in detail below with reference to FIGS. 3-9. In some embodiments the controller 16 introduces a correlation signal (arrow COR) to the control logic 100 and thereafter executes a control action with respect to the rotor 12 and/or other components of the system 10 via transmission of a set of output signals (arrow CCo) determined based on the corrected position. For instance, the controller 16 may control a state of the electric machine, such as maintaining or changing a torque or speed from the rotor 12, e.g., an output shaft 30 of the electric machine 200 of FIG. 2, or change or maintain a d-axis or q-axis current of the electric machine 200. As a result, the control action may include controlling a state of the electric machine 200 so as to achieve a commanded speed or output torque of the electric machine 200.

Ideally, the raw sine and cosine signals (arrow 11) provided by the sensor 14 in FIG. 1 would have the same amplitude, zero offset, and would be orthogonal, i.e., phase-shifted by exactly 90 degrees relative to each other. However, misalignment of sensor 14 and other factors can produce the types of position errors addressed herein. Left uncorrected, such errors may ultimately result in current ripple and torque ripple, thereby affecting control functionality within the system 10. To help solve this problem, the controller 16 is configured to eliminate position errors occurring at the fundamental frequency of the sensor 14, i.e., at the same frequency as the raw sine and cosine signals (arrow 11).

The vector-based position sensor 14 as shown schematically in FIG. 1 may be included as part of an electrical system 20 and variously embodied as a rotary resolver, encoder, magneto-resistive sensor, or other sensor type operable for generating the raw sine and cosine signals (arrow 11) with amplitude and phase information. The rotor 12 may be a driven or driving rotary component of a vehicle or powertrain, such as a rotor of an electric machine, an engine shaft or a flywheel, or other type of wheel, shaft, gear element, or other rotary device having a rotational speed (arrow N), an axis of rotation (A), and a determinable angular or rotary position with respect to the axis of rotation (A). The rotor 12 may be coupled to a shaft 13 such that torque produced from the rotation of the rotor 12 may be delivered to a coupled load.

Figure 2:
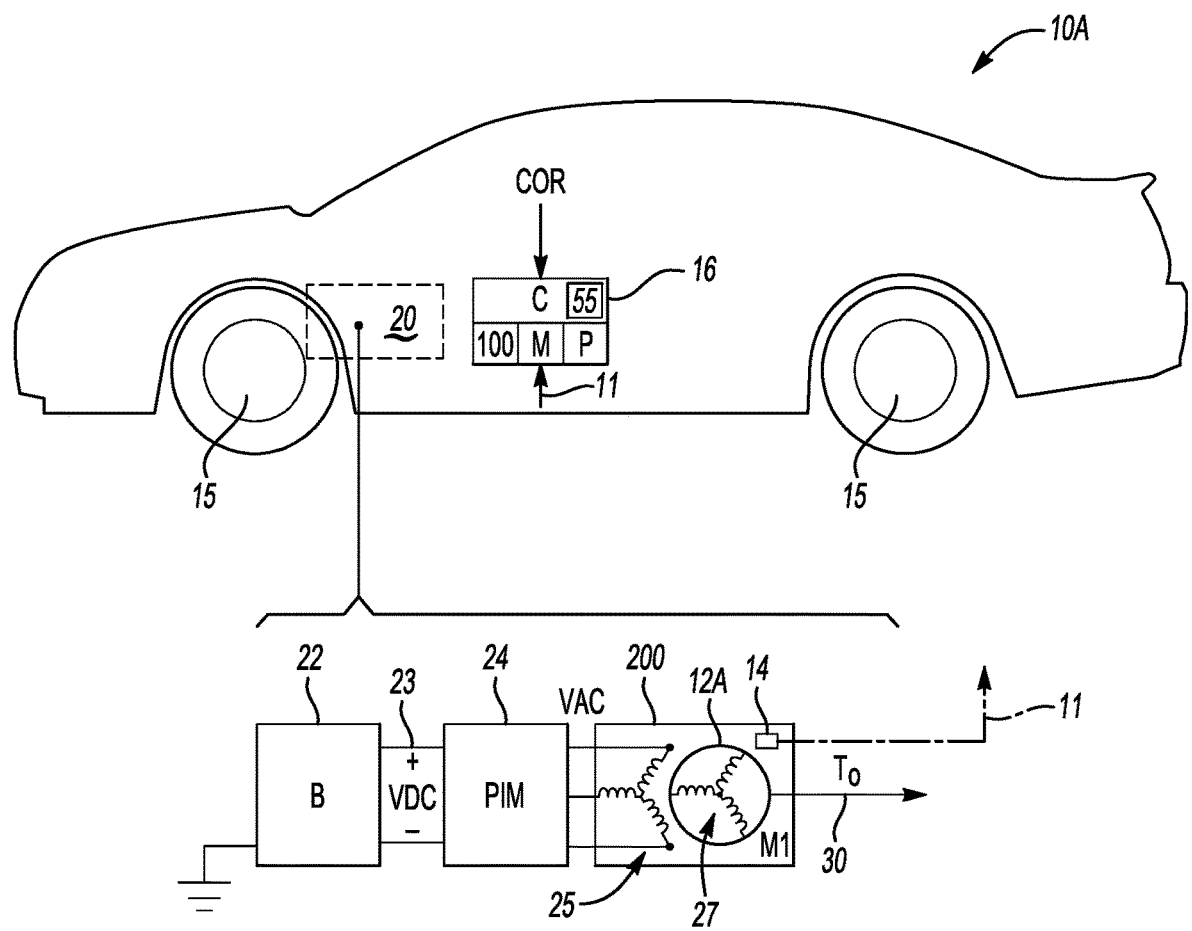
FIG. 2 is a schematic illustration of a vehicle equipped with a rotor in the form of an electric machine rotor or output shaft and the controller of FIG. 1.

As depicted in FIG. 2, for instance, the rotor 12 of FIG. 1 may be optionally embodied as the electric machine 200 (M1) used as a source of torque within an electrical system 20 of an automotive vehicle 10A, of a robot or other mobile platform, or alternatively of a power plant or an appliance. The electric machine 200 is operable for generating and delivering output torque (arrow To) to a connected load, for instance front and/or rear drive wheels 15 either directly or via a transmission (not shown), or alternatively to generate electricity for storage in a battery pack (B) 22.

By way of illustration, the electric machine 200 may be embodied as a polyphase electric traction motor having stator windings 25 and rotor windings 27. When the windings 25 and 27 are electrically energized, a rotor 12A connected to a motor output shaft 30 delivers the output torque (arrow To) to the drive wheels 15 or another load such as a belt and pulley system (not shown). In the illustrated example embodiment, a power inverter module (PIM) 24 is electrically connected to the battery pack 22 over a high-voltage bus 23 and operable for inverting a direct current voltage (±VDC) and corresponding electrical current from the battery pack 22 into an alternating current voltage (VAC) and electrical current, e.g., using a series of semiconductor switches, diodes, and other semiconductor components (not shown) and pulse width modulation or other suitable switching techniques. In other embodiments, the rotor 12 of FIG. 1 may be configured as an engine shaft, a flywheel, or other component (not shown) having a measurable rotary position.

In order to control operation of the rotor 12, the controller 16 is programmed and equipped with integral control logic 100 having various integrator blocks 51A, 51B, and 151 as described below with reference to FIGS. 3-9. The term "integrator block" as used herein refers to portions of the control logic 100 providing the integral term or error-accumulation function within the controller 16. Additionally, the controller 16 shown in FIGS. 1 and 2 includes a motion state-filter (MSF) 55 that acts in cooperation with the integrator blocks 51A, 51B, and 151 within the control logic 100 to ultimately eliminate position error occurring at the fundamental frequency of the sensor 14.

Figure 6:
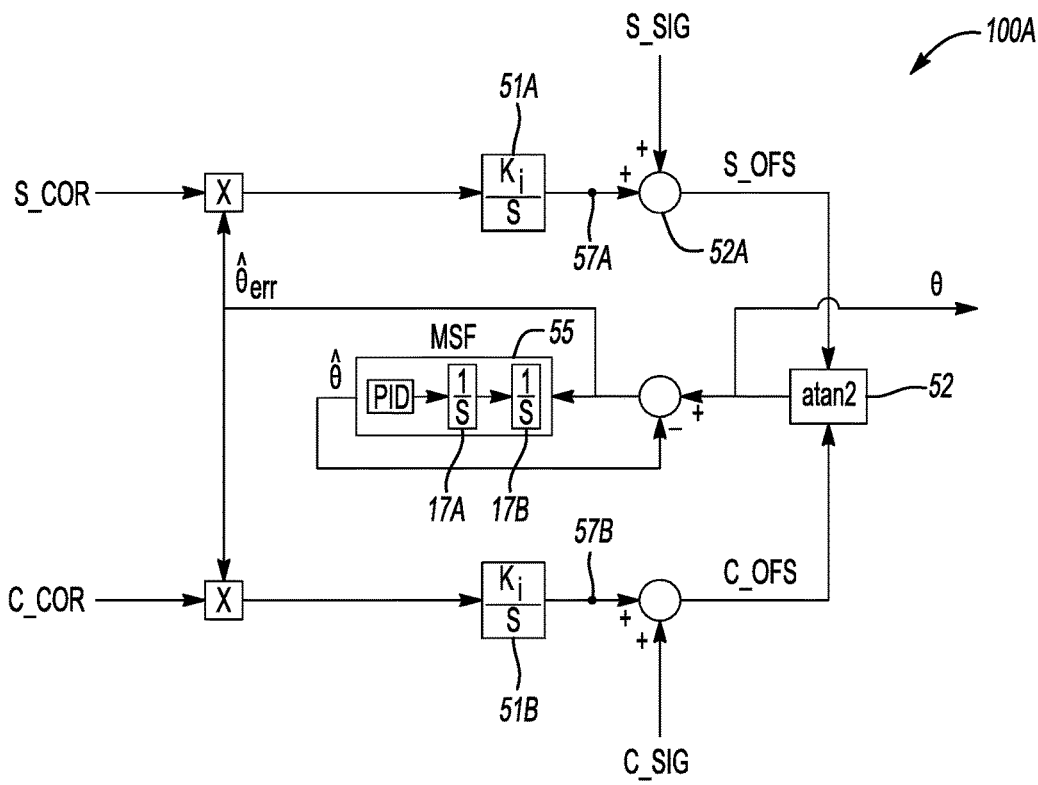
FIG. 6 is a schematic control block diagram for alternative embodiment of the integral control logic shown in FIG. 4.

Referring briefly to FIG. 6, the MSF 55 acts by modeling the motion dynamics of the system 10 of FIG. 1 using two integrators 17A and 17B, denoted 1/s, with the integral of acceleration being velocity and the integral of velocity being the estimated position $\hat{\theta}$. The MSF 55 may use PID control to force the estimated position $\hat{\theta}$ to track a measured position $\theta$. In a variation, the derivative term of such a PID controller may bypass the integrator 17A in order to avoid having to perform the differentiation process. Motion state-filters such as the MSF 55 are thus available PID controllers with low-pass characteristics that, in some embodiments, can be tuned as a function of the speed of the rotor 12 as described below.

Referring again to FIG. 2, the controller 16 may be embodied as one or more computer devices with memory (M) and a processor (P). The memory (M) may include tangible, non-transitory memory, e.g., read-only memory, whether optical, magnetic, flash, or otherwise. The controller 16 also includes sufficient amounts of random access memory, electrically-erasable programmable read-only memory, and the like, as well as a high-speed clock, analog-to-digital and digital-to-analog circuitry, and input/output circuitry and devices, as well as appropriate signal conditioning and buffer circuitry.

The raw sine and cosine signals (arrow 11 of FIGS. 1 and 2) output by the sensor 14 or extracted from the outputs of the sensor 14 via signal processing may contain position error at the fundamental frequency of the sensor 14. More precisely, the output of the operation block 52 of FIG. 6 contains such error, or in other words the position information obtained from the sine and cosine signals may be erroneous as opposed to the physical position of the rotor 12.

Figure 3:
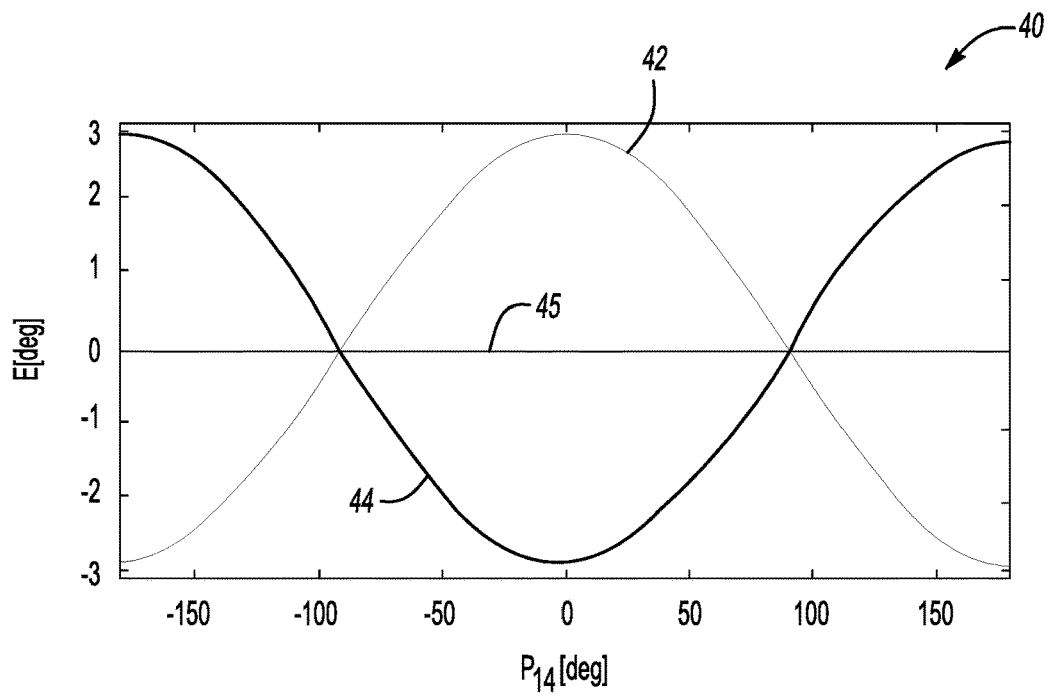
FIG. 3 is a plot of position error from raw sensor outputs and error induced by adding offsets to raw sine and cosine signals as set forth herein, with position error in degrees plotted on the vertical axis and raw position in degrees plotted on the horizontal axis.

FIG. 3 is an illustrative example of pre-existing position measurement error prior to the control logic 100 being introduced. Such position error is illustrated as a set of traces 40, with actual position in degrees ($P_{14}$[deg]) depicted on the horizontal axis and position measurement error in degrees (E[deg]) depicted on the vertical axis. Trace 42 represents a position measurement error that is intentionally introduced via the integral control logic 100 or its variants 100A, 100B, or 100C of FIGS. 6, 8, and 9 as part of the present approach. Via the control logic 100, the measurement error that is intentionally introduced, i.e., trace 42, is approximately equal and opposite to the raw fundamental harmonic position error (trace 44) occurring at the fundamental frequency of the sensor 14, such that the errors cancel each other out to produce a net reduced position measurement error of trace 45. Operation of the integral control logic 100 is intended to drive such fundamental harmonic position measurement error (trace 44) to zero as quickly as possible.

Figure 4:
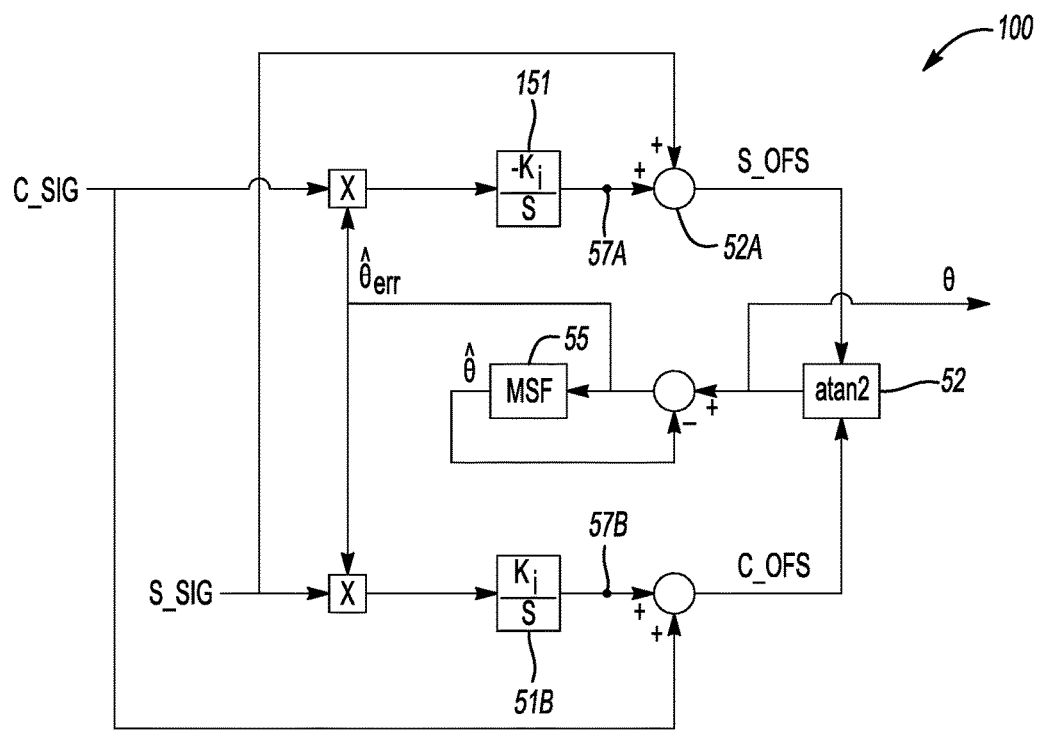
FIG. 4 is a schematic control block diagram for an example embodiment of integral control logic executable by the controller of FIGS. 1 and 2.

A simplified approach toward achieving the error cancellation effect shown schematically in FIG. 3 can be seen in the example integral control logic 100 of FIG. 4. Here, the control logic 100 operates without requiring knowledge of the particular dynamics of the MSF 55. Instead, the respective raw sine and cosine signals (arrows S_SIG and C_SIG) corresponding to signals 11 of FIGS. 1 and 2 are operated on by the MSF 55 and a pair of integrator blocks 151 and 51B. The notations $$\frac{K_i}{s} \text{ and } \frac{-K_i}{s}$$

denote that the integrator blocks 51B and 151 handle the steady-state component or average value of the fundamental harmonic position measurement error by manipulating the offsets of the raw sine and cosine signals, respectively.

The output at node 57B of integrator block 51B describes an initial offset value at node 57B that is added to the raw cosine signal (arrow C_SIG) to produce an offset cosine signal (arrow C_OFS). A similar function is performed using the raw sine signal (arrow S_SIG) at integrator block 151, i.e., with an offset sine signal (arrow S_OFS) ultimately generated by adding output of the integrator block at node 57A to the raw sine signal (arrow S_SIG). A mathematical operator block 52 is shown as an example "a tan 2" block 52 to represent an arctangent function having two arguments. A corrected position signal (arrow $\theta$) is then output by the operator block 52 and used by the controller 16 to control an action of the rotor 12, the vehicle 10A, or another system 10 using the rotor 12.

The MSF 55 may be configured to have predetermined phase properties with low-pass qualities, and outputs an estimated position (arrow $\hat{\theta}$) as explained above with brief reference to FIG. 6. The estimated position (arrow $\hat{\theta}$) is subtracted from the corrected position (arrow $\theta$) to produce an error term (arrow $\hat{\theta}_{err}$). The error term contains position error information, which the controller 16 via operation of the control logic 100 correlates to the fundamental harmonic of the sensor 14. Thus, with each successive loop of the logic 100, the error term (arrow $\hat{\theta}_{err}$) is multiplied (X) by the raw cosine signal (arrow C_SIG) and fed into the integrator block 151, multiplied by the raw sine signal (arrow S_SIG), and fed into the integrator block 51B to successively drive the fundamental harmonic component of position measurement error to zero as represented by trace 45 of FIG. 3.

Figure 5:
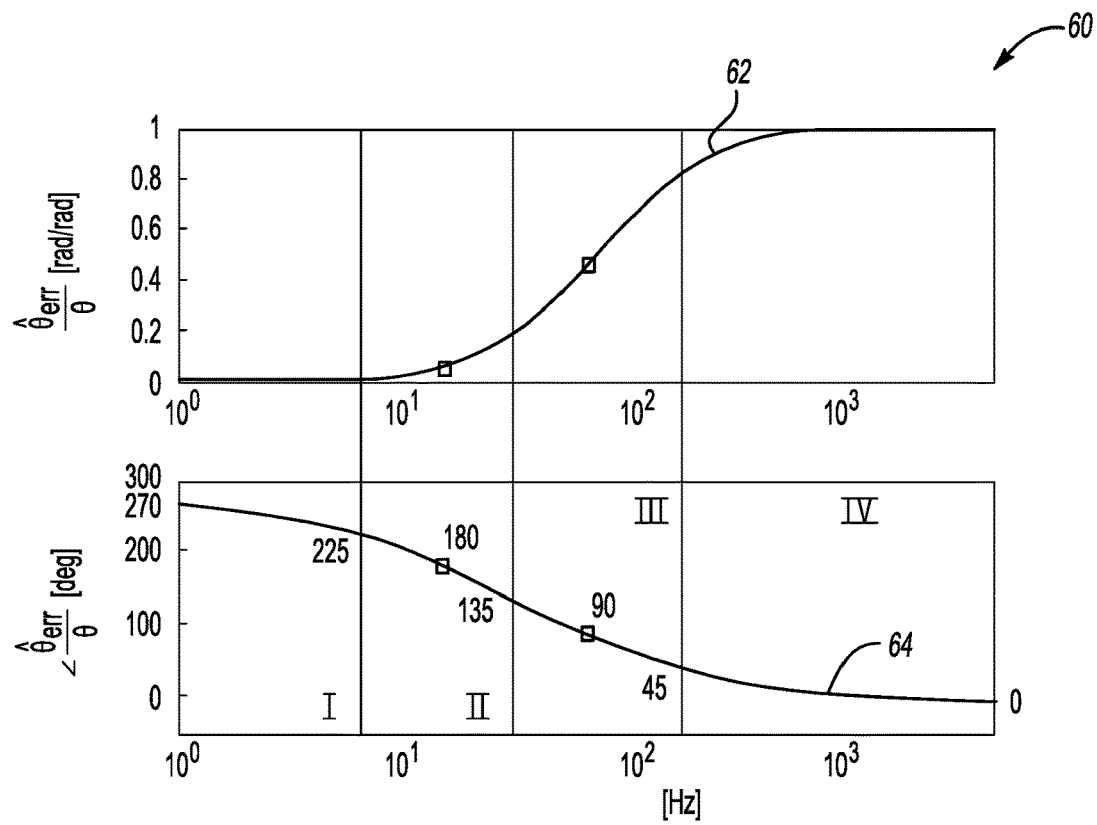
FIG. 5 is an illustrative magnitude and phase plot of the position error signal over the input position signal corresponding to the dynamics of the motion-state filter shown in FIG. 4.

FIG. 5 illustrates, via a set of traces 60, an example of the magnitude and phase dynamics or speed-based variations of the MSF 55 of FIG. 4, with frequency in hertz (Hz) depicted on the horizontal axis. Magnitude (trace 62) and phase lead (trace 64) are depicted on the vertical axes, with magnitude represented as $$\left| \frac{\hat{\theta}_{err}}{\theta} \right|$$

in radians/radians and phase lead represented as $$\angle \frac{\hat{\theta}_{err}}{\theta}$$

in degrees.

As shown, the phase lead of the MSF 55 can be broken into four designated zones I, II, III, and IV. The frequency of the fundamental harmonic component of the position measurement error depends on the rotational speed of the rotor 12, and FIG. 5 illustrates that the phase lead of the estimated position error ($\hat{\theta}_{err}$) output from the MSF 55 is frequency-dependent. Therefore, the phase lead of the fundamental component of the estimated position error ($\hat{\theta}_{err}$) depends on the rotational speed of the rotor 12. It is also noted that an ideal phase of the estimated position error ($\hat{\theta}_{err}$), from the perspective of the convergence dynamics of the integral control logic 100 and its variants, would be a multiple of 90°, i.e., 0°, 90°, 180°, and 270°. This knowledge is usable by the controller 16 in reducing the error represented by trace 44 of FIG. 3 as described above.

Figures 7, 8:
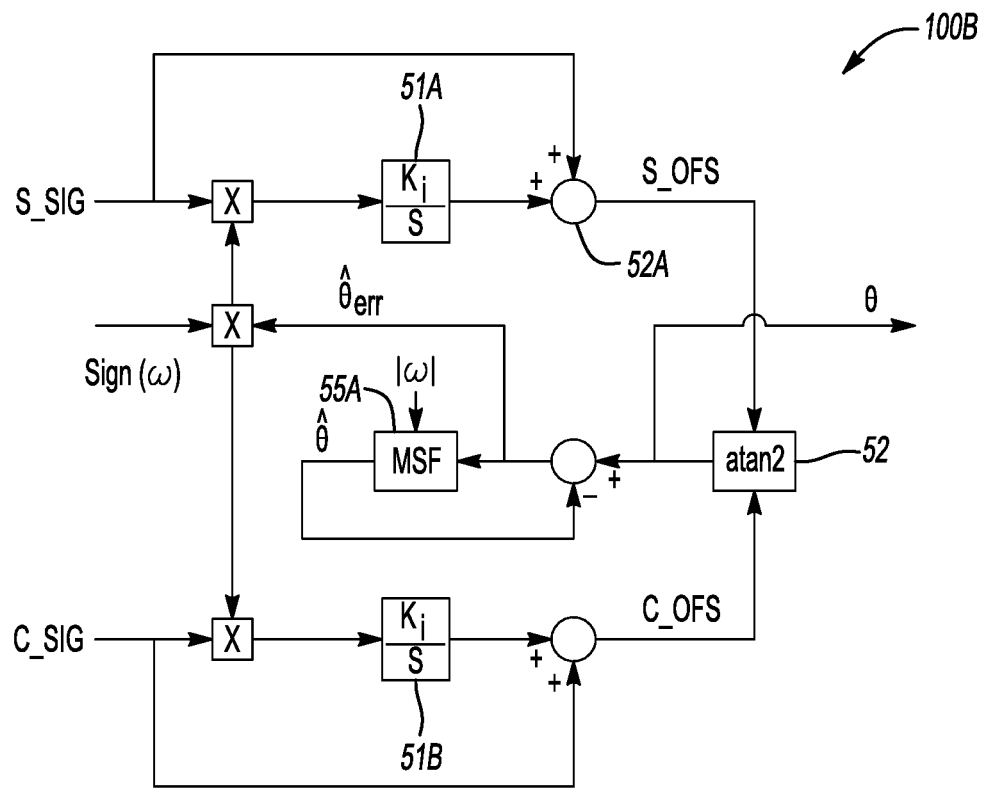
FIG. 7 is a lookup table usable in certain embodiments to determine phase-based correlation inputs to the control block diagram shown in FIG. 6.
FIGS. 8 and 9 are alternative schematic control block diagrams of the integral control logic shown in FIG. 4.

Referring again to FIG. 6 in conjunction with FIG. 7, an alternative set of integral logic 100A is depicted to that of the simplified embodiment of FIG. 4. Rather than operating solely on the raw sine and cosine signals from the sensor 14, the embodiment of FIG. 6 uses predetermined correlation signals S_COR and C_COR as additional inputs to the control logic 100A. The controller 16 may be programmed with a lookup table such as the example table depicted in FIG. 7, with the controller 16 extracting the correlation signals S_COR and C_COR depending on a particular phase zone (Z) of operation of the MSF 55. Also shown in FIG. 3, the zones (Z) may include a first zone (I) in which the phase lead, indicated as $$\angle \frac{\hat{\theta}_{err}}{\theta},$$

is in a range of 225-270 degrees, a second zone (II) corresponding to 135-225 degrees, a third zone (III) corresponding to 45-135 degrees, and a fourth zone (IV) corresponding to 0-45 degrees. As will be clear from FIG. 7, zones (I) and (III) differ from each other in the sign of the correlation signals S_COR and C_COR, with the same relationship being present between zones (II) and (IV).

Therefore, the embodiment of FIG. 6 may include using the error signal, $\hat{\theta}_{err}$, with the corrected position (θ) from operation block 52, and determining the corresponding phase zone I, II, III, or IV of the fundamental harmonic component of $\hat{\theta}_{err}$. Because the actual phase of the error may not be known, the controller 16 determines the zone based on the fundamental frequency, e.g., using block 17A or speed of the rotor 12. Upon determining the zone, the controller 16 selects the correlation signals S_COR and C_COR according to FIG. 7 and uses the selected signals as inputs to the control logic 100A. Thus, FIG. 6 provides a possible embodiment in which the correlation signals or other inputs to the logic 100A are manipulated in response to the dynamics of the MSF 55, i.e., the inputs change as a function of the rotational speed of the rotor 12 of FIG. 1.

Figure 9:
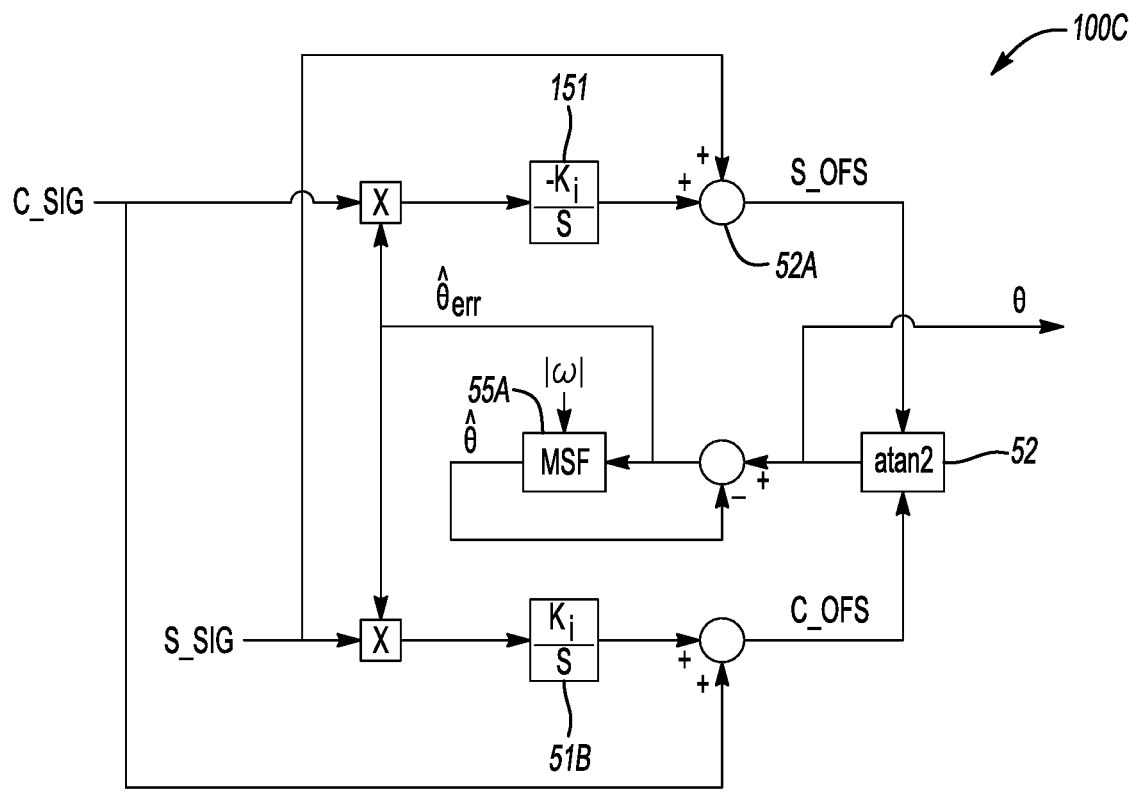

As will be appreciated by those having ordinary skill in the art, possible variations to the control logic 100 and 100A may achieve similar results, either in terms of convergence rate or simplicity of programming. Two further examples are illustrated in FIGS. 8 and 9. In both Figures, the prior-described MSF 55 is modified using an input term, |ω|, to provide speed-dependent tuning of an MSF 55A. The result of the modification in FIG. 8 is that 90 degrees of phase lead of the MSF 55A is maintained at the fundamental frequency of the sensor 14. In other words, the controller 16 may schedule a gain of the motion-state filter so as to maintain or remain in a single corresponding phase zone.

In the illustrated example of FIG. 8, the control strategy remains in zone III, i.e., with the correlation signals S_COR and C_COR being the values S_SIG*sign(ω) and C_SIG*sign(ω), respectively. However, the approach in FIG. 8 will work with the inputs corresponding to the remaining zones I, II, or IV. Similar to operation of the logic 100B of FIG. 8, the logic 100C of FIG. 9 ensures a fixed phase lead of the MSF 55A is maintained at the fundamental frequency of the sensor 14, in this instance 180 degrees.

Thus, using the disclosed computationally efficient approaches, fundamental harmonic position measurement errors may be largely eliminated in systems relying on measurements from vector-based position sensors, such as the sensor 14 of FIG. 1. The disclosed approaches are completely position sensor-driven, and can compensate over a wide speed and load range with overall improved convergence dynamics. These and other benefits may be readily appreciated by one of ordinary skill in the art in view of the forgoing disclosure.

While the best modes for carrying out the disclosure have been described in detail, those familiar with the art to which this disclosure relates will recognize various alternative designs and embodiments for practicing the disclosure within the scope of the appended claims.

What is claimed is:

1. A rotary system comprising:
   a rotor having an axis of rotation;
   a vector-based position sensor configured to measure an angular position of the rotor with respect to the axis of rotation, and to output a raw sine signal and a raw cosine signal having a fundamental position measurement error, the raw sine signal and the raw cosine signal being representative of the measured angular position; and
   a controller configured to:
     receive the raw sine signal and the raw cosine signal from the position sensor,
     process the raw sine signal with a first integrator to create a cosine signal offset value,
     add the cosine signal offset value to the raw cosine signal to create an offset cosine signal,
     process the raw cosine signal with a second integrator to create a sine signal offset value,
     add the sine signal offset value to the raw sine signal to create an offset sine signal,
     calculate a corrected position of the rotor using the offset sine signal and the offset cosine signal,
     iteratively process the corrected position with a motion state filter to reduce error in the corrected position, and
     control an action of the rotary system using the corrected position.

2. The rotary system of claim 1, wherein the vector-based position sensor is a resolver, a rotary encoder, or a magneto-resistive sensor.

3. The rotary system of claim 1, wherein the rotary system includes an output shaft of an electric machine, and wherein the controller is configured to control a state of the output shaft of the electric machine as the action.

4. The rotary system of claim 1, wherein the controller is programmed to determine a corresponding phase zone of an estimated position error of the rotor, and to select correlation signals based on the corresponding phase zone to thereby generate the offset sine and cosine signals, wherein the phase zones include a first zone having a phase lead in a range of 225-270 degrees, a second zone having a phase lead in a range of 135-225 degrees, a third zone having a phase lead in a range of 45-135 degrees, and a fourth zone having a phase lead in a range of 0-45 degrees.

5. The rotary system of claim 4, wherein the controller is configured to manipulate the correlation signals as a function of a rotational speed of the rotor.

6. The rotary system of claim 1, further comprising an electric machine having a motor output shaft, wherein the rotary system includes the motor output shaft.

7. The rotary system of claim 6, wherein the electric machine is part of a powertrain of a motor vehicle having drive wheels, the motor output shaft is configured to deliver output torque to the drive wheels, and the control action includes controlling a state of the electric machine to achieve a commanded speed or output torque of the electric machine.

8. A method for eliminating a fundamental position measurement error in a rotary system having a rotor with an axis of rotation, the method comprising:
measuring an angular position of the rotor with respect to the axis of rotation using a vector-based position sensor;
outputting a raw sine signal and a raw cosine signal representative of the measured angular position, wherein the raw sine signal and the raw cosine signal include the fundamental position measurement error;
receiving the raw sine signal and the raw cosine signal from the position sensor via a controller;
within the controller,
processing the raw sine signal with a first integrator to create a cosine signal offset value;
adding the cosine signal offset value to the raw cosine signal to create an offset cosine signal;
processing the raw cosine signal with a second integrator to create a sine signal offset value;
adding the sine signal offset value to the raw sine signal to create an offset sine signal;
calculating a corrected position of the rotor using the offset sine signal and the offset cosine signal; and
iteratively processing the corrected position with a motion state filter to reduce error in the corrected position; and
controlling an action or state of the rotary system via the controller using the corrected position.

9. The method of claim 8, wherein measuring the angular position is achieved using a resolver, a rotary encoder, or a magneto-resistive sensor.

10. The method of claim 8, wherein the controller is programmed to determine a corresponding phase zone of an estimated position error of the rotor, further comprising: selecting correlation signals based on the corresponding phase zone, and generating the offset sine and cosine signals using the correlation signals, wherein the phase zones include a first zone having a phase lead in a range of 225-270 degrees, a second zone having a phase lead in a range of 135-225 degrees, a third zone having a phase lead in a range of 45-135 degrees, and a fourth zone having a phase lead in a range of 0-45 degrees.

11. The method of claim 8, wherein the controller is programmed to determine a corresponding phase zone of an estimated position error of the rotor, further comprising: scheduling a gain of the motion-state filter to maintain the corresponding phase zone.

12. The method of claim 8, wherein the rotary system includes a motor output shaft of an electric machine, and controlling the action or state of the rotary system includes controlling a motion state of the motor output shaft.

13. The method of claim 12, wherein controlling a motion state of the motor output shaft includes regulating a d-axis or q-axis current of the electric machine.

14. The method of claim 12, wherein the electric machine is part of a powertrain of a motor vehicle having drive wheels, further comprising delivering the output torque to the drive wheels.

15. The method of claim 8, wherein the motion state filter includes a PID control.

* * * * *